Patented Apr. 18, 1939

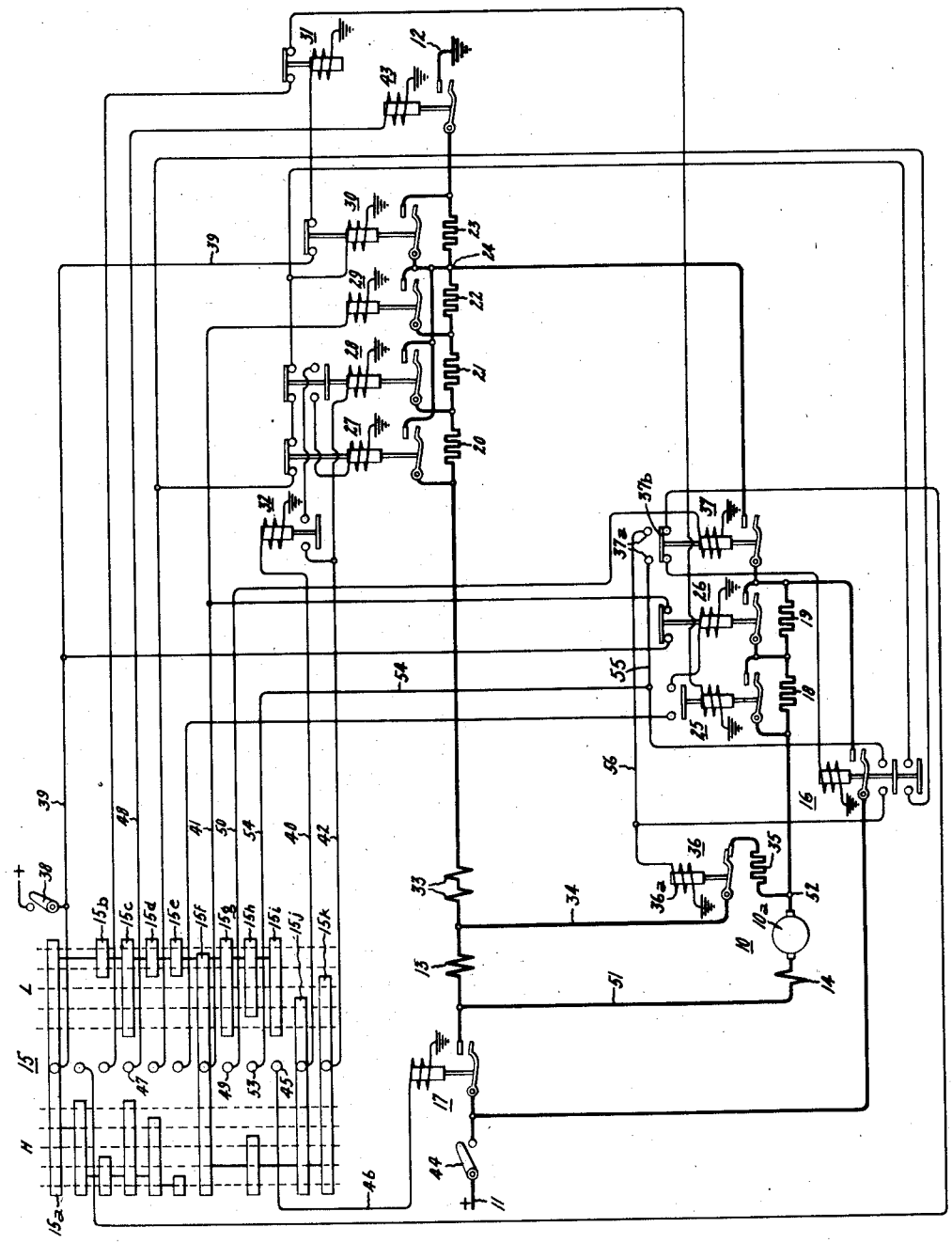

2,155,373

UNITED STATES PATENT OFFICE 2,155,373

CONTROL SYSTEM

James W. Cooke, Schenectady, N. Y., assignor to General Electric Company, a corporation of New York Application May 25, 1938, Serial No. 209,943

12 Claims. (Cl. 172—179)

This invention relates to control systems, more particularly to systems for controlling the operation of electric motors, and it has for an object the provision of a simple, reliable, and improved control system of this character.

More specifically, the invention relates to motor control systems for crane hoist apparatus and the like in which the load is frequently of such magnitude that it overhauls the motor during the lowering operation. In crane operation, it is important to be able to "inch" or 'jog' a heavy load in the lowering direction. For example, in changing rolls in a steel rolling mill, it is necessary to jog the hoist motor to lower the roll in steps as small as a quarter of an inch, in order that the roll may be properly set in its bearings without marring the highly polished surface of the roll.

When such a load is supported on a crane hook, it is prevented from being lowered by means of an electrically operated mechanical friction brake, the shoes of which are set against a drum on the motor shaft by means of heavy springs. An electric magnet is provided for releasing the brake shoes against the spring tension. It is desirable to use the current flowing in the motor windings for energizing the brake magnet operating coil. On other hoist controls when the driving motor is first connected to the supply source, a very large current is taken which is sufficient to effect a rapid and complete release of the brake. A complete and rapid release of the brake is detrimental to accurate jogging. Even if the brake could be released without the motor developing any driving torque and with a load on the hook equal to the rated load of the crane, gravity would accelerate the load and all rotating parts so quickly that the load would travel a considerable distance before the operator could return the master switch to the off position to set the brake. However, some driving torque must be obtained from the motor to meet other operating conditions, such for example, as to overcome friction of the crane when lowering non-overhauling loads, and this torque adds to the pull of the load until dynamic braking is established and consequently adds to the difficulty of accurate jogging. Accordingly, a further object of this invention is the provision of means for providing accurate jogging of the motor and its load in the lowering direction.

Another object of the invention is the provision of means for establishing dynamic braking circuits on both the first and second points "lowering" of the master switch to provide different lowering speeds together with means for insuring the establishment of the second dynamic braking circuit prior to interrupting the first dynamic braking circuit upon movement of the master switch to the first and second points and reestablishment of the first dynamic braking circuit prior to interruption of the second upon return of the master switch to the off position, and which also insures reestablishment of the first dynamic braking circuit in the event of failure of the second circuit.

In carrying the invention into effect in one form thereof, the brake magnet operating coil is connected in series relationship with the field winding of the motor, and its other terminal is connected to one side of a supply source. The other terminal of the field winding is connected to an armature terminal and means are provided for connecting both of these terminals to the opposite side of the supply source, and a connection is provided from the other terminal of the armature to the brake coil to cause part of the armature current to flow through the brake coil, and a resistor is included in a parallel connection from this other armature terminal for diverting a substantial portion of the armature current from the brake operating coil to retard the energization of the operating coil and to effect slow and gradual release of the brake upon movement of a master switch to an operative position to energize the motor so as to provide for return of the master switch to the off position to deenergize the motor and set the brake before it has been completely released.

Accurate jogging is obtained by a relatively slow reduction of brake shoe pressure on the brake drum so as to prevent an overhauling load from moving too far before the master switch can be returned to the off point. The slow reduction in pressure keeps the load under control. The application of the brake shoe pressure on returning the master switch to off point is made as rapid as possible to prevent drifting of the load and thereby to effect a rapid stop. This method of releasing and applying the pressure of the shoes is obtained by the use of a divided circuit, one branch of which includes the brake magnet operating coil of relatively high reactance, and the other branch of which includes a relatively low reactance together with means for rapidly opening the low reactance branch. The foregoing divided circuit arrangement introduces a definite time lag in the rise of current in the high reactance branch and therefore in the brake coil, the current being momentarily forced through the low reactance branch. This produces the slow reduction in brake shoe pressure.

The opening of the lower branch of the divided circuit which forms a discharge path around the brake coil simultaneously with the opening of the line contactor causes the most rapid possible decay of current in the brake coil, and this results in rapid application of brake shoe pressure.

For a better and more complete understanding of the invention, reference should now be had to the following specification and to the accompanying drawing, the single figure of which is a simple, diagrammatical illustration of an embodiment of the invention.

Referring now to the drawing, a motor 10, such for example, as a motor utilized to drive a hoist, is supplied from a suitable source represented by the supply lines 11, 12. The motor 10 is illustrated as a direct-current, series type motor having an armature 10a, a series field winding 13, and a commutating field winding 14.

Suitable means are provided for controlling the direction of rotation of motor 10. These means are illustrated as a multi-point, reversing type master switch 15 and a pair of switching devices 16, 17 under the control of the master switch. The positions on the left-hand side of the master switch are referred to as the hoisting positions, and when the master switch is operated to these positions, the switching device 16, referred to as the hoisting contactor, is closed to connect the armature of the motor 10 to the source for rotation in a direction to hoist the load. Similarly, the positions on the right-hand side of the master switch are the lowering positions, and when the master switch is operated to these positions, the lowering contactor 17 is closed to connect the motor 10 to the source for rotation in a direction to lower the load.

Suitable current limiting means illustrated as a plurality of resistors 18 and 19 are connected in the armature circuit of the motor. For the purpose of varying the field excitation of the motor, a plurality of resistors 20, 21, and 22 are included in the field circuit of the motor. A resistor 23 is connected in both the armature and field circuits of the motor, that is to say, it is connected in series relationship between the junction point 24 of the field and armature circuits and the side 12 of the supply source. Contactors 25 and 26 serve to control the shunting of resistors 18 and 19 respectively, and the contactors 27, 28, 29, and 30 serve to control the shunting of resistors 20, 21, 22, and 23.

A relay 31 controls the energization of contactor 25 in response to operation of master switch 15, and a control relay 32 cooperates with contactor 28 to control the energization of contactor 27.

Motor 10 is provided with a mechanical friction brake (not shown) which comprises a drum on the shaft of motor 10 and a plurality of brake shoes clamped into engagement with the drum by suitable means such as a heavy spring. An operating coil 33 is provided for releasing the brake shoes from engagement with the drum against the tension of the spring. Frequently two brakes with operating coils connected in series are used as indicated in the drawing.

Brake operating coil 33 is connected in series relationship with series field winding 13; the left-hand terminal of brake operating coil 33 is connected to the right-hand terminal of field winding 13 and the other terminal of coil 33 is connected through resistors 20, 21, 22, and 23, to the side 12 of the supply source.

The left-hand terminal of field winding 13 is connected through commutating field winding 14 to the left-hand terminal of motor armature 10a. For the purpose of causing part of the armature current to flow through the brake operating coils 33, when desirable, or part of the field current to flow through resistors 35, 18 and 19 to 24 and thence to negative side of the source, a cross connection 34 is provided from the connection point of armature 10a and resistor 18 to the connection point of field winding 13 and brake operating coil 33. A suitable current limiting resistor 35 is included in this cross connection, and a suitable switching device 36 is provided for opening and closing this cross connection at various stages of the operation. Preferably switching device 36 is a normally closed electromagnetic contactor provided with an operating coil 36a for opening the normally closed contacts when the coil is energized. Suitable means, such for example as a spring (not shown), are provided for maintaining the contacts closed when the coil is deenergized. Thus, when the master switch is in the off position after having been returned from an operative position, normally closed contactor 36 establishes a dynamic braking circuit for motor 10 during deceleration and when the motor is at standstill. The current flowing in this dynamic braking circuit is limited by resistor 35.

In order to divert a portion of the armature current from the brake operating coil 33 when the master switch 15 is moved from its off position to the first or second operative positions lowering, a suitable switching device illustrated as an electromagnetic contactor 37 is provided for establishing a connection from the right-hand terminal of motor armature 10a through resistors 18 and 19 to a suitable point in the circuit between the right-hand terminal of brake operating coil 33 and the side 12 of the supply source. When contactor 37 is operated to its closed position, a portion of the armature current of motor 10 is bypassed around the brake operating coil 33. In addition, contactor 37, when closed, establishes a second dynamic braking circuit for the armature of motor 10.

Contactor 37 is provided with upper normally open interlocking contacts 37a in circuit with the operating coil of contactor 36 which are bridged by the movable contact member 37b when contactor 37 is operated to its closed position. Thus this interlocking arrangement serves to insure the closing of contactor 37 prior to the opening of contactor 36 and thereby serves to insure the establishment of the second dynamic braking circuit prior to the opening of the first dynamic braking circuit when the master switch is moved from its off position to the first or second operative positions lowering. Likewise this arrangement insures reestablishment of the first dynamic braking circuit in the event of failure of the second dynamic braking circuit.

With the foregoing understanding of the elements and apparatus and their organization in the system, the operation of the system itself will readily be understood from the following detailed description: The control switch 38 is closed to connect the segments of the master switch 15 to the positive side of a supply source which is preferably the supply source 11, 12. Thus when control switch 38 is closed, every segment of master switch 15 is connected to the positive side of the supply source. In the closed position of control switch 38, an energizing circuit is established for the operating coil of relay 31 which is traced through conductor 39 and the normally closed interlocks of contactor 30 through operating coil of relay 31 to the opposite side of the supply source represented by the ground symbol. In response to energization relay 31 opens its contacts and thereby interrupts the energizing circuit for the operating coil of contactor 25. Similarly, an energizing circuit is established for the operating coil of control relay 32 that is traced from the segment 15₁ of master switch 15 through conductor 40 and operating coil of control relay 32 to the opposite side of the supply source. In response control relay 32 closes its contacts thereby partially to complete an energizing circuit for the operating coil of contactor 27.

An energizing circuit is established for operating coil of contactor 29 that is traced from segment 15ᵣ through conductor 41 and operating coil of contactor 29 to the opposite side of the supply source. Contactor 29 closes in response to energization and short-circuits resistor 22. Similarly, a circuit is established for operating coil of contactor 28 that is traced from segment 15ₖ of the master switch through conductor 42 and operating coil of contactor 28 to the opposite side of the supply source. Contactor 28 in responding to energization closes its main contacts to short-circuit resistor 21 and closes its lower interlocking contacts to complete an energizing circuit for the operating coil of contactor 27 that is traced from segment 15ₖ of the master switch through conductor 42, the contacts of relay 32, lower interlock contacts of contactor 28 through operating coil of contactor 27 to the opposite side of the supply source. Contactor 27 responds to energization and closes its main contacts to short-circuit resistor 20.

The remainder of the apparatus is in the condition in which it is illustrated in the drawing. Thus line contactors 17 and 43 are open so that motor 10 is disconnected from the source 11, 12. Contactor 36 is deenergized and its normally closed contacts complete a dynamic braking circuit for motor 10 that is traced from the right-hand terminal of armature 10ₐ through resistor 35, normally closed contacts of contactor 36, series field winding 13, and commutating field winding 14 to the left-hand terminal of armature 10ₐ. The brake operating coil 33 is deenergized and the brake shoes are set against the drum by means of its spring.

It is assumed that the load on the hook is equal to the rated load of the crane. Prior to operation of the system, the line switch 44 is closed.

If it is desired to jog the load in the lowering direction, master switch 15 may be operated either to the first or second right-hand positions lowering and quickly returned to the off position. The operation resulting from actuation of the master switch to the first position and return to the off position is as follows: In the first right-hand position of the master switch, an energizing circuit is established for the operating coil of lowering contactor 17 that is traced from segment 15₁ and finger 45 through conductor 46 and operating coil of contactor 17 to the opposite side of the supply source. Simultaneously, an energizing circuit is established for the operating coil of line contactor 43 that is traced from the segment 15ₑ and cooperating finger 47 of the master switch 15 through conductor 48 and operating coil of contactor 43 to the opposite side of the supply source. At the same time an energizing circuit is established for the operating coil of contactor 37. This circuit is traced from segment 15_d and cooperating finger 49 of the master switch through conductor 50 and operating coil of contactor 37 to the opposite side of the supply source.

As a result of their simultaneous energization, contactors 17, 43 and 37 simultaneously close their main contacts. In their closed positions, contactors 17 and 43 connect the motor 10 to the source 11, 12 for rotation in the lowering direction. The field winding and brake operating coil circuit extends from the positive side 11 of the supply source through the main contacts of contactor 17, series field winding 13, brake operating coil 33, main contacts of contactor 27, resistor 23, and contacts of contactor 43 to the negative side 12 of the supply source. The armature circuit of motor 10 extends from the positive side of the supply source through contacts of contactor 17, conductor 51, commutating field winding 14, and armature 10ₐ to the junction point 52 at which the armature circuit divides. One branch of the armature circuit extends from point 52 through resistor 35, normally closed contacts of contactor 36 through conductor 34 and thence through brake operating coil 33 to the negative side of the supply source. The other branch of the armature circuit extends from the point 52 through resistors 18, 19 and contacts of contactor 37 to the junction point 24 and thence through resistor 23 to the negative side 12 of the supply source.

At the instant of closing of contactors 17, 37, and 43, current flows through commutating field winding 14, armature 10ₐ, and resistors 18, 19, and 23. Current builds up rapidly in this circuit because the circuit is one of relatively low reactance. Also, current flows through series field windings 13 and brake operating coils 33 to the negative side of the supply source but on account of the high reactance of the brake coils 33, most of the current through the series field momentarily takes the non-inductive path through resistors 35, 18, 19, and 23. As the current builds up through the brake coils, the direction of current flow through the conductor 34 reverses and a portion of the armature current flows from the junction point 52 through resistor 35, contacts of contactor 36, and conductor 34 through the brake operating coils to the negative side of the supply source. However, the path established by the contactor 37 through the resistors 18 and 19 serves to divert a substantial portion of the armature current around the brake operating coils 33. The foregoing phenomena cause the flux in the brake operating coils to build up gradually rather than rapidly as it would do if there were no non-inductive parallel path. The slow build-up of current in the brake operating coils 33 produced by the cross connection 34 and the parallel path through resistors 18 and 19 and contactor 37 slowly and gradually reduces the pressure on the brake shoes but does not entirely release them. With this arrangement the armature starts to rotate slowly as soon as the reduced braking torque is just overcome by the pull from the hook load. This movement will be gradual, however, as there is still considerable brake friction to be overcome; hence the operator has time to move the master switch back to the off point to deenergize the motor and brake operating coil before the load moves too far. When the master switch returns to the off point, line contactors 17 and 43 and contactor 37 open simultaneously. Contactor 37 in opening removes the discharge path around the brake coils. Consequently, decay of current in the brake operating coils 33 is practically instantaneous and this causes a very rapid increase in brake shoe pressure rapidly stopping the movement of the load. However, the dynamic braking circuit through the armature and series field winding is retained because contactor 36 remains closed. The dynamic braking torque produced from this circuit assists the brake shoes in stopping the load.

Lowering of the load by continuous motion instead of by jogging movements is accomplished by moving the master switch from its off position to any of its operating positions lowering. Movement of the master switch to the first lowering position results in the establishment of connections and operations described in the foregoing and accordingly, the description of these connections and operations will not be repeated.

Movement of the master switch to the second position lowering establishes an energizing circuit for the operating coil of dynamic braking contactor 36. This circuit is traced from the segments 15h of the master switch and its cooperating finger 53 through conductors 54 and 55, upper interlock contacts 37a of contactor 37 (closed in the first position of the master switch), through conductor 56 and operating coil 36a of contactor 36 to the opposite side of the supply source. In response to energization, contactor 36 opens its contacts to open the cross connection between the junction point 52 and the connection point between the series field winding 13 and brake operating coils 33, and thereby to interrupt the dynamic braking circuit previously traced from the junction point 52 through resistor 35 and series field winding 13 to the left-hand terminal of the armature 10a. However, before the contactor 36 can be opened, it is necessary for the contactor 37 to close. In closing, contactor 37 establishes a second dynamic braking circuit for motor 10 that is traced from the junction point 52 through resistors 18 and 19, contacts of contactors 37, 29, 28, and 27, brake coils 33, series field winding 13, conductor 51, (commutating field winding 14) to the left-hand terminal of armature 10a. Thus the interlocking control connections between contactors 37 and 36 insure the establishment of a second dynamic braking circuit for the motor 10 prior to the interruption of the first dynamic braking circuit. If the operating coil of contactor 37 should burn out while operating on this point of the master switch, or any point beyond, the movable contact member 37b would drop out of engagement with stationary contact 37a, thereby to interrupt the energizing circuit for the operating coil of contactor 36. As a result of deenergization, contactor 36, which is a spring closed contactor, would close its contacts to reestablish the first dynamic braking circuit. Furthermore, it will be noted that the segment 15g of the master switch which controls the energization of contactor 37 overlaps the segment 15h which controls the contactor 36 when the master switch is being returned to the off position. On returning to the off position, the master switch passes through the first point and effects the closing of the contactor 36 before reaching the off position and opening the contactor 37. This overlapping on the first point lowering eliminates any tendency to drop the load, if jogging is done on the second point lowering. Thus the control provides two separate safety features.

Movement of the master switch 15 to the third, fourth, and fifth operating positions results in short-circuiting the resistors 18 and 19 in the armature circuit of the motor and inserting the resistors 20, 21, and 22 in the field circuit, thereby to increase the torque and speed of the motor 10. When the master switch 15 is returned to the off position, the resistors 18 and 19 are again inserted in the armature circuit and the resistors 20, 21, and 22 are again short-circuited. The sequence and specific operations of the contactors 25 to 30 inclusive controlling the short-circuiting and insertion of resistors 18 to 22 inclusive is not necessary to an understanding of the invention and accordingly, such description is omitted.

Although in accordance with the provisions of the patent statutes this invention is described as embodied in concrete form and the principle is explained together with the best mode in which it is now contemplated applying that principle, it will be understood that the specific elements and connections shown and described are merely illustrative and that the invention is not limited thereto, since alterations and modifications will readily suggest themselves to persons skilled in the art without departing from the true spirit of this invention or from the scope of the annexed claims.

What I claim as new and desire to secure by Letters Patent of the United States, is:

1. A motor control system for crane hoists and the like for lowering overhauling and non-overhauling loads comprising in combination, a direct-current driving motor provided with a field winding, a mechanical friction brake having an operating coil connected in series relationship with said field winding, a first resistor connected in series relationship with the armature of said motor, said resistor and armature being connected in parallel with said field winding and brake coil, and a second resistor cross connected from the connection point between said armature and first resistor to the connection point between said field winding and said brake coil.

2. A motor control system for crane hoists and the like comprising in combination, a mechanical brake for the motor having an operating coil for releasing the brake, a master switch having an operative position and an off position for controlling the starting and stopping of the motor, and means responsive to movement of the master switch from said off position to said operative position for effecting a relatively slow release of the brake so that said master switch may be returned to said off position before said brake is completely released, said means being responsive to return of said master switch to said off position for effecting a relatively rapid setting of said brake thereby to effect accurate jogging operation of said motor.

3. A motor control system for crane hoists and the like comprising in combination, a direct-current electric driving motor provided with a field winding having one terminal connected to one terminal of the armature, a mechanical friction brake provided with an operating coil having one terminal connected to the other terminal of said field winding in series relationship therewith, a resistor connected from the other terminal of said armature to the connection point between said field winding and operating coil for causing armature current to flow through said brake operating coil, and a second resistor connected from said other terminal of said armature to the other teminal of said operating coil so that a portion of the armature current of said motor is diverted from said operating coil.

4. A control system for a direct-current electric motor provided with a field winding having one terminal connected to an armature terminal comprising in combination, a mechanical brake having an operating coil connected in series relationship with said field winding and having one terminal connected to the other terminal of said field winding, a resistor connected from the other armature terminal to the point of connection between said field winding and brake coil, a second resistor having a terminal connected to said other armature terminal, a normally open line contactor between said first-mentioned field winding and armature terminals and one side of a supply source, a second normally open contactor between the other terminal of said second resistor and the other side of said supply source, a master switch having an off position and a plurality of successive operative positions, and energizing connections established in response to movement of said switch from said off position to the first operative position for closing said contactors.

5. A motor control system for crane hoists and the like in which the load becomes overhauling at times during the lowering operation comprising in combination, a direct-current driving motor provided with a field winding, a mechanical brake having an operating coil connected in series relationship with said field winding, a resistor connected in series relationship with the armature of said motor, said resistor and armature being connected in parallel with said field winding and brake coil, and a cross connection from the connection point between said armature and resistor to the connection point between said field winding and brake coil.

6. A motor control system comprising in combination, a direct-current electric motor, a master switch having an off position and an operative position for controlling the operation of the motor, means for establishing a first dynamic braking circuit for said motor when said master switch is in said off position, means responsive to operation of said master switch to said operative position for interrupting said first dynamic braking circuit and establishing a second dynamic braking circuit for said motor and responsive to return of said master switch to said off position for interrupting said second dynamic braking circuit and reestablishing said first dynamic braking circuit, and interlocking control means for insuring the establishment of said second circuit prior to interruption of said first circuit upon operation of said master switch to said operative position and for insuring reestablishment of said first circuit prior to interruption of said second circuit upon return of said master switch to said off position.

7. A control system for an electric motor comprising in combination, a master switch having an off position and an operative position, a normally closed contactor for establishing a first dynamic braking circuit for said motor in the off position of said master switch, said contactor being responsive to operation of said master switch to said operative position for interrupting said first dynamic braking circuit and responsive to return of said master switch to said off position for reestablishing said first dynamic braking circuit, a second contactor responsive to operation of said master switch to said operative position for establishing a second dynamic braking circuit for said motor and responsive to return of said master switch to said off position for interrupting said second circuit, and interlocking control circuits controlled by said second contactor and said master switch for insuring the establishment of said second dynamic braking circuit prior to the interruption of said first dynamic braking circuit and for insuring reestablishment of said first circuit prior to interruption of said second circuit.

8. A motor control system for crane hoists and the like comprising in combination, a mechanical brake provided with an operating coil having substantial reactance for releasing the brake, a master switch having an operative position and an off position for controlling the starting and stopping of the motor, a connection between the armature of said motor and said operating coil for causing a portion of the armature current to flow through said operating coil upon operation of said master switch to said operative position, and means responsive to operation of said switch to said operative position for establishing a circuit of relatively low reactance in parallel with said brake coil to retard the energization of said coil and thereby to effect a relatively slow and gradual release of said brake so that said switch can be returned to said off position before said brake is completely released, said means also being responsive to return of said switch to said off position to interrupt said parallel circuit thereby to interrupt the discharge path for said operating coil to effect relatively rapid setting of said brake to produce accurate jogging operation of said motor.

9. A motor control system for crane hoists and the like comprising in combination a mechanical brake provided with an operating coil having substantial reactance for releasing said brake, a master switch having an operative position and an off position for controlling the starting and stopping of said motor, a connection from the armature of said motor to said operating coil including a resistor and a normally closed contactor for causing a portion of the armature current to pass through said operating coil when said master switch is moved to said operative position, a second resistor of relatively low reactance and a normally open contactor responsive to movement of said master switch to said operative position for connecting said second resistor in parallel with said operating coil to retard the energization thereof and so as to effect a slow and gradual release of said brake to provide for return of said master switch to said off position before said brake is completely released, said normally open contactor being responsive to return of said master switch to said off position to interrupt said parallel circuit thereby to interrupt the discharge path for said operating coil to effect relatively rapid decay of the flux of said coil and relatively rapid setting of said brake thereby to produce accurate jogging operation of said motor.

10. A motor control system for crane hoists and the like in which the load becomes overhauling at times during the lowering operation comprising in combination, a direct-current electric motor provided with a field winding, a mechanical brake having an operating coil connected between one terminal of said field winding and one side of a supply source, a master switch having an off position and an operative position, a contactor responsive to operation of said master switch from said off position to said operative position for connecting the other terminal of said field winding and one terminal of the armature of said motor to the opposite side of said supply source, a connection from the other armature terminal to the connection between said field winding and operating coil to cause armature current to flow in said coil, a resistor having one terminal connected to said other armature terminal, and a second contactor responsive to operation of said master switch to said operative position to connect the other terminal of said resistor to said one side of said source to divert momentarily a portion of the armature current from said brake coil thereby to effect relatively slow release of said brake so as to provide for jogging said motor by return of said master switch to said off position prior to complete release of said brake.

11. A motor control system for crane hoists and the like in which the load becomes overhauling at times during the lowering operation comprising in combination, a direct-current electric motor provided with a field winding, a mechanical friction brake having an operating coil connected between one terminal of said field winding and one side of a source of supply, a normally open contactor for connecting the other terminal of said field winding and one terminal of the motor armature to the opposite side of the supply source, a normally closed contactor for connecting the other armature terminal to the connection between said coil and field winding to cause armature current to flow through said operating coil and to establish a dynamic braking circuit for said armature, a second normally open contactor for establishing a connection to bypass a portion of the armature current around said operating coil and to provide a second dynamic braking circuit for said armature, a master switch operable from an off position to an operative position to close said normally open contactors and to open said normally closed contactor and interlocking connections insuring the closing of said second normally open contactor prior to the opening of said normally closed contactor.

12. A motor control system comprising in combination, a direct-current electric motor provided with a field winding having one terminal connected to an armature terminal, a mechanical brake having an operating coil connected between the other terminal of said field winding, and one side of a supply source, a normally open contactor for connecting said first mentioned armature and field winding terminals to the opposite side of the supply source, a connection from the other armature terminal to the connection point between said field winding and operating coil so that armature current is caused to flow through said coil, a resistor connected to said other armature terminal, a second normally open contactor connected between said other armature terminal and said one side of said supply source, and a master switch operable from an off position to an operative position to close said contactors substantially simultaneously thereby to divert a portion of the armature current around said operating coil to effect relatively slow release of the brake and to provide for jogging of the motor by returning said master switch to said off position to disconnect said motor from said source when said brake is partially released.

JAMES W. COOKE.